J. F. CROWE.
PIPE UNION.
APPLICATION FILED MAR. 21, 1917.
1,248,275. Patented Nov. 27, 1917.
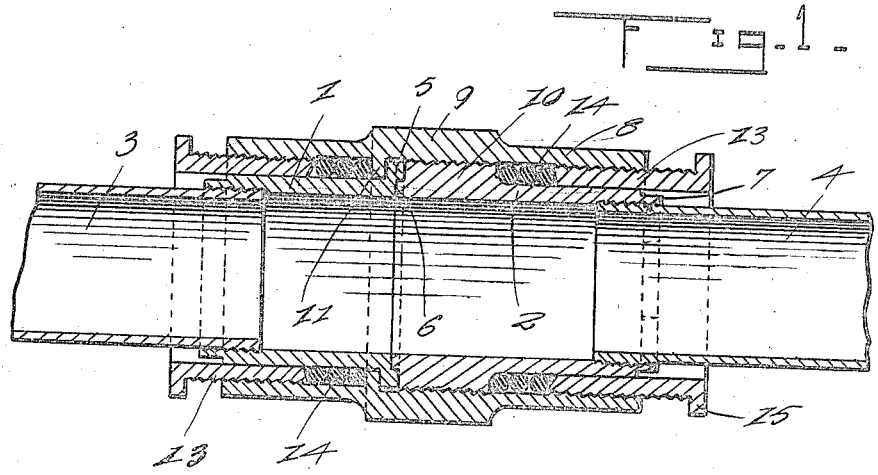
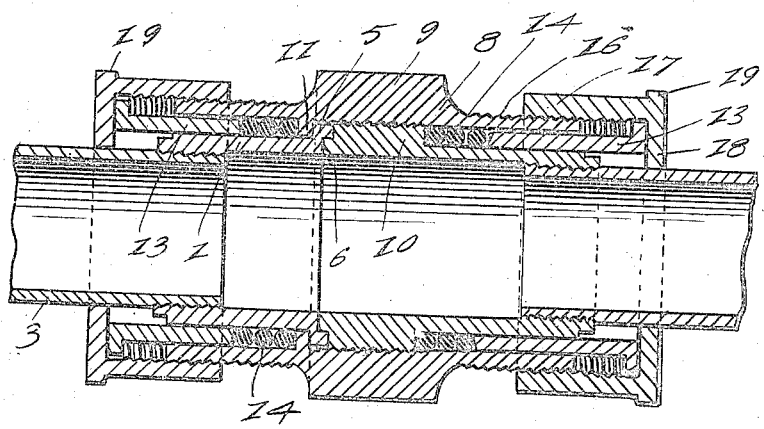
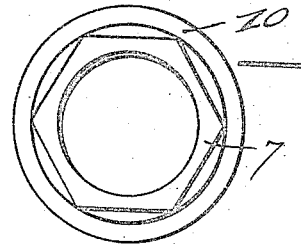
Witnesses
C. W. Bealle.
W. F. Davidson.
Inventor
J. F. Crowe.
By [signature]
Attorney

UNITED STATES PATENT OFFICE.

JOHN F. CROWE, OF SAN FRANCISCO, CALIFORNIA.

PIPE-UNION.

1,248,275.          Specification of Letters Patent.          Patented Nov. 27, 1917.

Application filed March 21, 1917. Serial No. 156,340.

*To all whom it may concern:*

Be it known that I, JOHN F. CROWE, a citizen of the United States, residing at San Francisco, in the county of San Francisco and State of California, have invented certain new and useful Improvements in Pipe-Unions; and I do hereby declare the following to be a full, clear, and exact description of the invention, such as will enable others skilled in the art to which it appertains to make and use the same.

This invention relates to a pipe union or coupling and has for one of its objects the provision of a device of this character, whereby a pair of pipes may be connected together and which will establish a water-tight connection between said pipes.

Another object of this invention is the provision of a pair of members threaded to the pipe and having their opposite ends grooved and flanged to interlock with each other and one of said members carrying a sleeve free to rotate thereon and adapted to be threaded to the other member to prevent said members from becoming detached.

A further object of this invention is the provision of packing means disposed between the sleeve and the members and having the means mounted upon the members for retaining the packing means between the sleeve and the members.

A further object of this invention is the provision of means carried by the sleeve for holding the means that engages the packing means upon the members.

A still further object of this invention is the provision of a pipe union or coupling of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts, as will be hereinafter more fully described and claimed.

For a complete understanding of my invention, reference may be had to the following description and accompanying drawing, in which:

Figure 1 is a longitudinal sectional view of a pipe union or coupling constructed in accordance with my invention, Fig. 2 is a longitudinal sectional view of a modified form of pipe union or coupling, constructed in accordance with my invention.

Fig. 3 is an end view of one of the connecting members illustrating the wrench engaging faces.

Referring in detail to the drawing, the numerals 1 and 2 indicate connecting members which have their outer ends internally screwthreaded to receive screwthreaded ends of pipes 3 and 4 which are to be connected together.

The other end of the member 1 is provided with an annular shoulder 5 having formed upon its inner face an annular groove to receive an annular extension 6 upon the other end of the member 2 from the connection to the pipe 4. In forming the annular extension 6 upon the member 2 there is provided a recess in which the inner face of the annular shoulder 5 rests thereby providing an interlocking connection between the members 1 and 2. The outer faces of the members 1 and 2 adjacent the ends which are threaded to the pipes 3 and 4, are provided with wrench engaging faces 7, whereby said members may be readily threaded to the pipes 3 and 4.

A sleeve 8 has an enlarged portion 9 formed intermediate its ends and the outer face of which may be of any shape to form wrench engaging faces, while its inner face is screwthreaded. Formed upon the inner end and upon the outer face of the member 2 is an enlarged portion 10 which is screwthreaded for coöperation with the screwthreads upon the enlarged portion 9 of the sleeve 8. The enlarged portion 9 of the sleeve 8 is provided with an inwardly directed annular flange 11 adapted to abut the shoulder 5 upon the members 1. This form of connection between the sleeve 8 and the member 1 permits said sleeve to rotate freely upon the member so that the sleeve may be readily threaded to the enlarged portion 10 upon the member 2 thus, it will be seen that the members 1 and 2 are locked together when the sleeve 8 has been threaded to the member 2. The ends of the sleeve 8 are internally screwthreaded to receive collars 13, which are externally screwthreaded. Interposed between the sleeve 8 and the members 1 and 2 are packing rings 14. The packing rings 14 upon the member 2 are adapted to be forced into engagement with the enlarged portion 10 thereof by one of the collars 13, while the other packing rings 14 upon the member 1 are adapted to be forced into engagement with the annular flange 11 upon the sleeve by the other collar 13, thus establishing a water and air proof connection between the pipes 3 and 4. The outer ends of the collar 13 have formed thereon annular flanges 15, the faces of which may be of any shape to form wrench engaging faces, whereby the collars 13 may be readily threaded within the sleeve 8 to compress the packing rings 14.

When desiring to disconnect the pipes 3 and 4, the collars 13 are unthreaded from the sleeve 8 and the enlarged portion 9 upon the sleeve 8 is unthreaded from the enlarged portion 10 upon the connecting member 2, thus permitting the members 1 and 2 to be separated.

Referring to my modified form of invention as disclosed in Fig. 2, it is identical in construction with my preferred form as disclosed in Fig. 1, except as follows: The collars 13 slide freely between the sleeve 8 and the members 1 and 2. The screwthreads upon the interior adjacent the ends of the sleeve 8 are removed to provide a smooth surface on which the collars 13 are to engage. The sleeve 8 is externally screwthreaded as shown at 16 upon each end thereof and has threaded thereon cuffs 17, which have inwardly directed annular flanges 18, the outer faces of which are so formed as to form wrench engaging faces 19. The flanges 18 engage the flanges 15 upon the collars 13 and upon threading the cuffs 17 upon the sleeve 8, the collars 13 will be moved inwardly compressing the packing rings 14.

While I have shown and described the preferred embodiment of my invention, it will be understood that minor changes in construction, combination and arrangement of parts may be made without departing from the spirit and scope of the invention as claimed.

What is claimed is:

1. A pipe union comprising a pair of connecting members, means for connecting pipes to the outer ends of said members, an annular shoulder formed upon the inner end of one of said members, an annular extension formed upon the inner end of the other member, and adapted to engage said shoulder, a sleeve surrounding said members and in spaced relation thereto, an enlarged portion formed on said sleeve and internally screwthreaded, an annular flange formed upon the inner wall of the sleeve and engaging the shoulder to rotatably connect said sleeve to one of said members, an enlarged portion formed upon the other member and threaded to the enlarged portion of the sleeve for connecting said members together, packing rings disposed between the sleeve and members, and means disposed between the members and sleeve for retaining the packing rings.

2. A pipe union comprising connecting members, means for connecting pipes to the outer ends of the members, a sleeve surrounding said members in spaced relation, means for rotatably connecting said sleeve to one of said members, and means for threading said sleeve to the other member to connect said members together, packing rings secured between the sleeve and the members, and collars disposed between the members and sleeve and threaded to said sleeve for retaining the packing rings within the sleeve.

3. A pipe union comprising a pair of attaching members, means for connecting said members to pipes, means formed upon the members for causing said members to interlock with each other, a sleeve threaded to one of said members and having its ends in spaced relation to said members, means for rotatably connecting said sleeve to the other member, and packing means disposed between said members and the sleeve.

In testimony whereof I affix my signature in presence of two witnesses.

JOHN F. CROWE.

Witnesses:
ROSE M. CROWE,
WILLIAM CROWE.

Copies of this patent may be obtained for five cents each, by addressing the "Commissioner of Patents, Washington, D. C."